US012380641B2

(12) United States Patent
Hou et al.

(10) Patent No.: US 12,380,641 B2
(45) Date of Patent: Aug. 5, 2025

(54) METHOD, DEVICE, AND COMPUTER PROGRAM PRODUCT FOR GENERATING 3D OBJECT MODEL UTILIZING MULTIPLE METADATA COMPONENTS OF DIFFERENT TYPES

(71) Applicant: Dell Products L.P., Round Rock, TX (US)

(72) Inventors: Anzhou Hou, Shanghai (CN); Zhisong Liu, Shenzhen (CN); Zhen Jia, Shanghai (CN); Tianxiang Chen, Shanghai (CN); Bin He, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 264 days.

(21) Appl. No.: 18/134,627

(22) Filed: Apr. 14, 2023

(65) Prior Publication Data
US 2024/0320907 A1 Sep. 26, 2024

(30) Foreign Application Priority Data
Mar. 24, 2023 (CN) .......................... 202310302354.0

(51) Int. Cl.
*G06F 16/58* (2019.01)
*G06F 16/535* (2019.01)
(Continued)

(52) U.S. Cl.
CPC ............ *G06T 17/00* (2013.01); *G06F 16/535* (2019.01); *G06F 16/5866* (2019.01);
(Continued)

(58) Field of Classification Search
None
See application file for complete search history.

(56) References Cited

U.S. PATENT DOCUMENTS 10,417,781 B1* 9/2019 Konolige ............ G06F 16/5854
2004/0267715 A1* 12/2004 Polson .................... G06F 16/40
(Continued)

OTHER PUBLICATIONS

Sketchfab, Inc. "Sketchfab—The Best 3D Viewer on the Web," https://sketchfab.com/, Accessed Mar. 13, 2023, 7 pages.
(Continued)

*Primary Examiner* — Joni Hsu
(74) *Attorney, Agent, or Firm* — Ryan, Mason & Lewis, LLP

(57) ABSTRACT

Embodiments of the present disclosure relate to a method, a device, and a computer program product for generating a three-dimensional (3D) object model. The method includes generating a first 3D object model based on multiple two-dimensional (2D) images of an object in different views. The method further includes acquiring metadata related to the first 3D object model by searching for information related to the object in at least one of a database and the Internet. The method further includes generating a second 3D object model by combining the first 3D object model and the metadata. The method for generating a 3D object model according to the present disclosure can automatically generate customizable and editable 3D model metadata, thereby significantly reducing labor, saving costs, improving efficiency, and improving user experience.

20 Claims, 5 Drawing Sheets

(51) Int. Cl.
  *G06F 16/78* (2019.01)
  *G06F 16/783* (2019.01)
  *G06F 16/953* (2019.01)
  *G06T 17/00* (2006.01)
  *G06V 10/74* (2022.01)

(52) U.S. Cl.
  CPC ...... *G06F 16/7837* (2019.01); *G06F 16/7867* (2019.01); *G06F 16/953* (2019.01); *G06V 10/761* (2022.01)

(56) References Cited

U.S. PATENT DOCUMENTS

| | | | |
|---|---|---|---|
| 2011/0072047 A1* | 3/2011 | Wang | G06F 16/583 |
| | | | 707/E17.071 |
| 2014/0140630 A1* | 5/2014 | Hwang | G06F 16/5854 |
| | | | 382/218 |
| 2018/0004760 A1* | 1/2018 | Bataller | G06N 5/04 |
| 2019/0236096 A1* | 8/2019 | Dal Mutto | G06N 3/045 |
| 2020/0098192 A1* | 3/2020 | Guerin | H04L 67/55 |
| 2022/0122328 A1* | 4/2022 | Giovannetti | G06T 7/70 |

OTHER PUBLICATIONS

Wikipidea, "Dell XPS," https://en.wikipedia.org/wiki/Dell_XPS, Mar. 5, 2023, 28 pages.
Dell Technologies, "XPS 13 Plus Laptop," https://www.dell.com/en-us/shop/laptops/new-xps-13-plus/spd/xps-13-9320-laptop, Accessed Mar. 13, 2023, 4 pages.
B. Mildenhall et al., "NeRF: Representing Scenes as Neural Radiance Fields for View Synthesis," European Conference on Computer Vision, Aug. 2020, 17 pages.

* cited by examiner

METHOD, DEVICE, AND COMPUTER PROGRAM PRODUCT FOR GENERATING 3D OBJECT MODEL UTILIZING MULTIPLE METADATA COMPONENTS OF DIFFERENT TYPES

RELATED APPLICATION

The present application claims priority to Chinese Patent Application No. 202310302354.0, filed Mar. 24, 2023, and entitled "Method, Device, and Computer Program Product for Generating 3D Object Model," which is incorporated by reference herein in its entirety.

FIELD

Embodiments of the present disclosure generally relate to the field of three-dimensional (3D) object models, and more specifically, relate to a method, a device, and a computer program product for generating a 3D object model.

BACKGROUND

A 3D object model of an object is a basic component in technologies relating to digital twin, metaverse, augmented reality (AR), virtual reality (VR), mixed reality (MR) and so on. Conventional two-dimensional (2D) to 3D modeling techniques can only create visual 3D object models, and lack more metadata other than visualization. Accordingly, in current solutions, it is necessary to manually integrate the metadata of objects into their 3D object model scenarios, which is too inconvenient and costly. Therefore, integrated or editable object metadata is crucial for improving user experience and accelerating the application of 3D object models in fields such as digital twin and metaverse.

SUMMARY

Embodiments of the present disclosure relate to a method, a device, and a computer program product for generating a 3D object model.

In an aspect of the present disclosure, a method is provided. The method includes: generating a first 3D object model based on multiple 2D images of an object in different views; acquiring metadata related to the first 3D object model by searching for information related to the object in at least one of a database and the Internet; and generating a second 3D object model by combining the first 3D object model and the metadata.

In another aspect of the present disclosure, an electronic device is provided. The electronic device includes a processing unit and a memory, where the memory is coupled to the processing unit and stores instructions. The instructions, when executed by the processing unit, cause the electronic device to perform the following actions: generating a first 3D object model based on multiple 2D images of an object in different views; acquiring metadata related to the first 3D object model by searching for information related to the object in at least one of a database and the Internet; and generating a second 3D object model by combining the first 3D object model and the metadata.

In still another aspect of the present disclosure, a computer program product is provided. The computer program product is tangibly stored on a non-transitory computer-readable medium and includes computer-executable instructions, the computer-executable instruction, when executed by a computer, causing the computer to perform a method or process according to embodiments of the present disclosure.

This Summary is provided to introduce relevant concepts in a simplified manner, which will be further described in the Detailed Description below. The Summary is neither intended to identify key features or essential features of the present disclosure, nor intended to limit the scope of embodiments of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
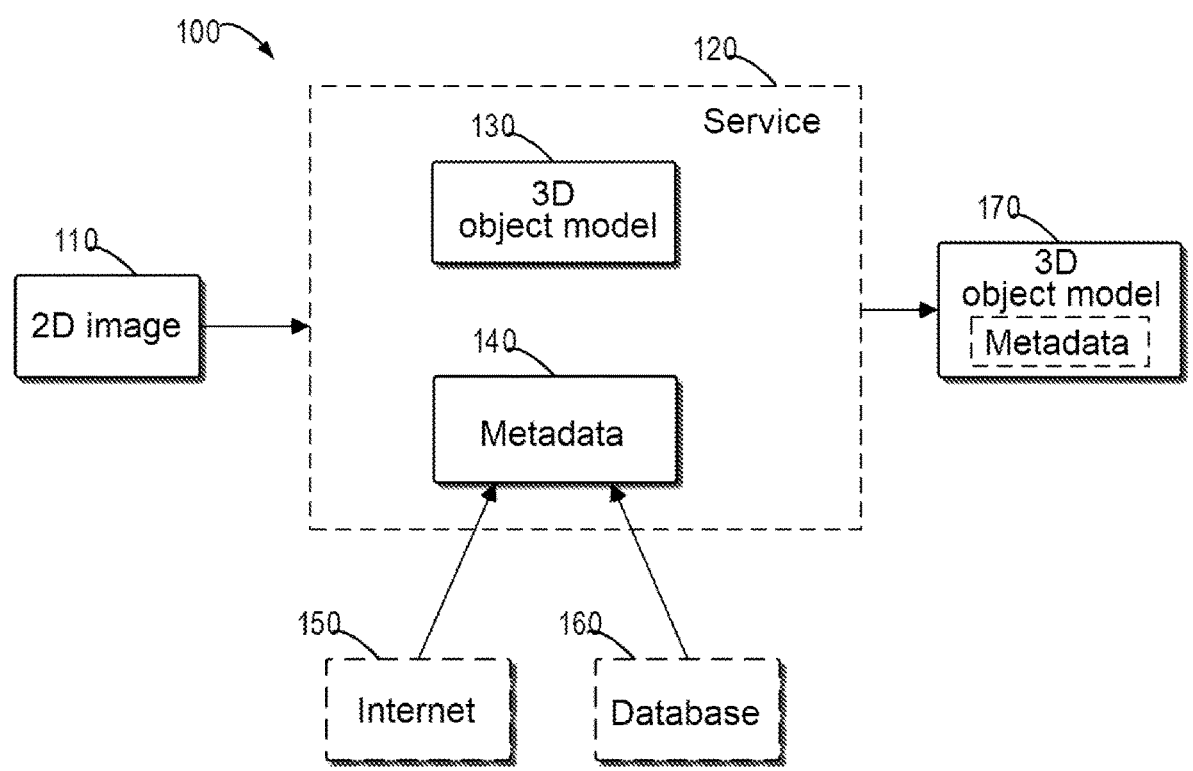
FIG. 1 shows a schematic diagram of an example environment for generating a 3D object model according to embodiments of the present disclosure.

Illustrative embodiments of the present disclosure will be described in more detail below with reference to the accompanying drawings. Although some embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless it is clearly stated that the terms refer to different objects.

As stated above, a 3D object model of an object is a basic component for building digital twin, metaverse, AR/VR/MR, and so on. Users may build 3D scenes by themselves, or assemble 3D object models by purchasing or obtaining them from third-party websites. Generally, users may design and create a 3D model of an object by means of software such as 3D MAX and Maya. Currently, the most advanced technology is the use of artificial intelligence (AI) algorithms, such as neural radiance fields (NeRF) and their variants, to quickly create a 3D object model by training some 2D images.

Virtual objects are an important part of immersive experiences in the fields of digital twin and metaverse. Techniques for quickly building a 3D object model of a virtual object will affect the efficiency of building a virtual world from the real world. Currently, high-cost methods of using special devices and sensors are used in the industry to build 3D object models of virtual objects, and technologies such as NeRF can convert 2D images into a 3D object model to accelerate the creation of the 3D model. However, even the NeRF technology has limitations, that is, it does not include metadata of a 3D model. Accordingly, conventional 2D to 3D modeling techniques can only create visual 3D object models, but lack more metadata other than visualization. Such a "formal" 3D object model that lacks metadata is not enough for virtual objects in a virtual world. These virtual objects require more metadata and information in addition to visualization to enable users to understand them and provide more value. For example, sometimes different users may be interested in different properties of objects in different scenarios. For example, for a building, an architect may be more concerned about the materials, architecture, and design of the building, but a real estate manager may be more concerned about the function and purpose of the building.

In order to obtain the above-mentioned more metadata and information in addition to visualization, in current solutions, it is necessary to manually integrate the metadata of objects into their 3D object model scenarios, which is too inconvenient and costly (including time costs and labor costs). In addition, information of conventional 3D models is embedded in 3D format files (such as 3D MAX, PLY files, etc.). Users must use specific professional tools for editing, which is not convenient for editing, conversion, and sales in the market. Therefore, integrated or editable object metadata is crucial for improving user experience and accelerating the application of object 3D object models in the fields of digital twin and metaverse.

Regarding this, embodiments of the present disclosure provide a method for automatically generating customizable 3D model metadata for a 3D model. This method can utilize an existing object detection method to detect objects and automatically generate metadata, allowing users to pre-edit, post-edit, and flexibly edit and integrate 3D object models. Specifically, in some embodiments, a first 3D object model is generated based on multiple 2D images of an object in different views. Subsequently, metadata related to the first 3D object model is acquired by searching for information related to the object in at least one of a database and the Internet. Then, a second 3D object model is generated by combining the first 3D object model and the metadata. For example, the NeRF can be used to generate the 3D object model, and then the method of the present disclosure can be used to automatically generate customizable 3D model metadata for the 3D object model.

By means of such technical ideas and methods, metadata generation can be integrated with 2D to 3D modeling during an object modeling process, and the metadata can be integrated with 3D models. Moreover, for the object metadata generation process, the object metadata can be automatically generated by object detection. In addition, illustrative embodiments provide users with greater flexibility, allowing users to edit and customize at multiple stages. In this way, by using more computing power (for example, by means of the use of an accelerator) to run AI tasks to detect objects and generate metadata for a 3D object model, as a software platform solution, illustrative embodiments can facilitate the construction of underlying infrastructure in the metaverse and a digital twin ecosystem, and can also be provided to customers as a combined XaaS ("X as a service," everything is service) offering.

Basic principles and several example implementations of the present disclosure are illustrated below with reference to FIG. 1 to FIG. 5. It should be understood that these example embodiments are given only to enable those skilled in the art to better understand and thus implement embodiments of the present disclosure, and are not intended to limit the scope of the present disclosure in any way.

FIG. 1 shows a schematic diagram of an example environment 100 for generating a 3D object model according to embodiments of the present disclosure. As shown in FIG. 1, in the example environment 100, multiple 2D images 110 of an object photographed by a user in different views are input to a service 120 according to the present disclosure, and the service 120 generates a visualized 3D object model 130 of the photographed object. Specifically, the service 120 may be software running on hardware (for example, a server, a terminal device, etc.), such as an application. As stated above, the visualized 3D object model 130 lacks more metadata of the object other than visualization, and the lack of these metadata cannot meet requirements of metaverse or digital twin for virtual objects in a virtual world. Therefore, the service 120 may acquire metadata 140 of the object from the Internet 150 and/or a database 160, and combine the visualized 3D object model 130 and the metadata 140 to generate a 3D object model 170 with the metadata 140, and output the 3D object model 170 to the user.

Figure 2:
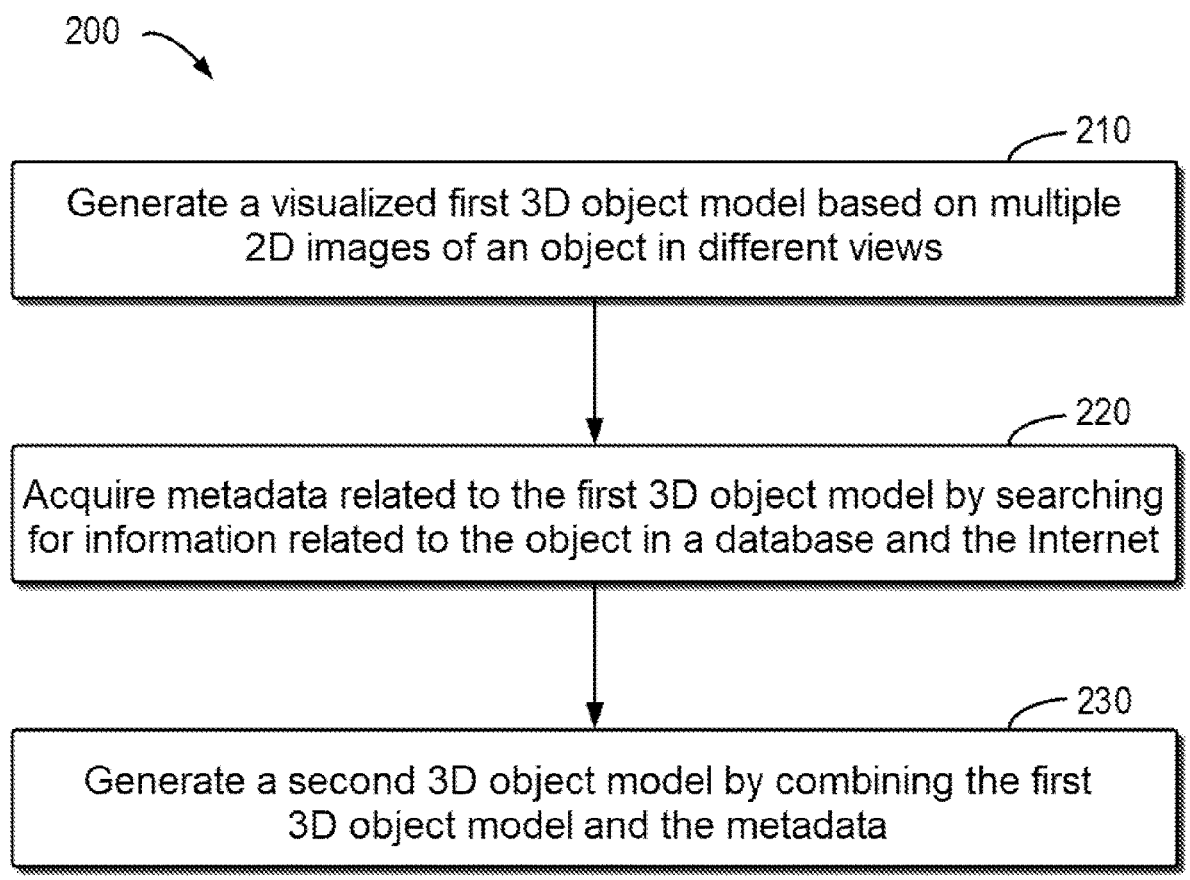
FIG. 2 shows a flow chart of a method for generating a 3D object model according to embodiments of the present disclosure.

FIG. 2 shows a flow chart of an example method 200 for generating a 3D object model according to embodiments of the present disclosure. The example method 200 will be described with reference to FIG. 1.

As shown in FIG. 2, in the example method 200, in 210, a visualized first 3D object model is generated based on multiple 2D images of an object in different views. For example, in combination with FIG. 1, a user may photograph the same object from different views to obtain multiple 2D images 110. Then, these multiple 2D images 110 are input to a service 120, and the service 120 generates the visualized 3D object model 130.

In 220, metadata related to the first 3D object model is acquired by searching for information related to the object in at least one of a database and the Internet. For example, in combination with FIG. 1, the service 120 may automatically search for information related to the object in the database 160 and the Internet 150 to obtain the metadata 140 related to the visualized 3D object model 130.

In 230, a second 3D object model is generated by combining the first 3D object model and the metadata. For example, in combination with FIG. 1, the service 120 may automatically combine the visualized 3D object model 130 and the metadata 140 to generate a 3D object model 170 with the metadata.

In this way, according to the example method 200, customizable and editable 3D model metadata can be automatically generated, which reduces time cost and labor cost.

Figure 3:
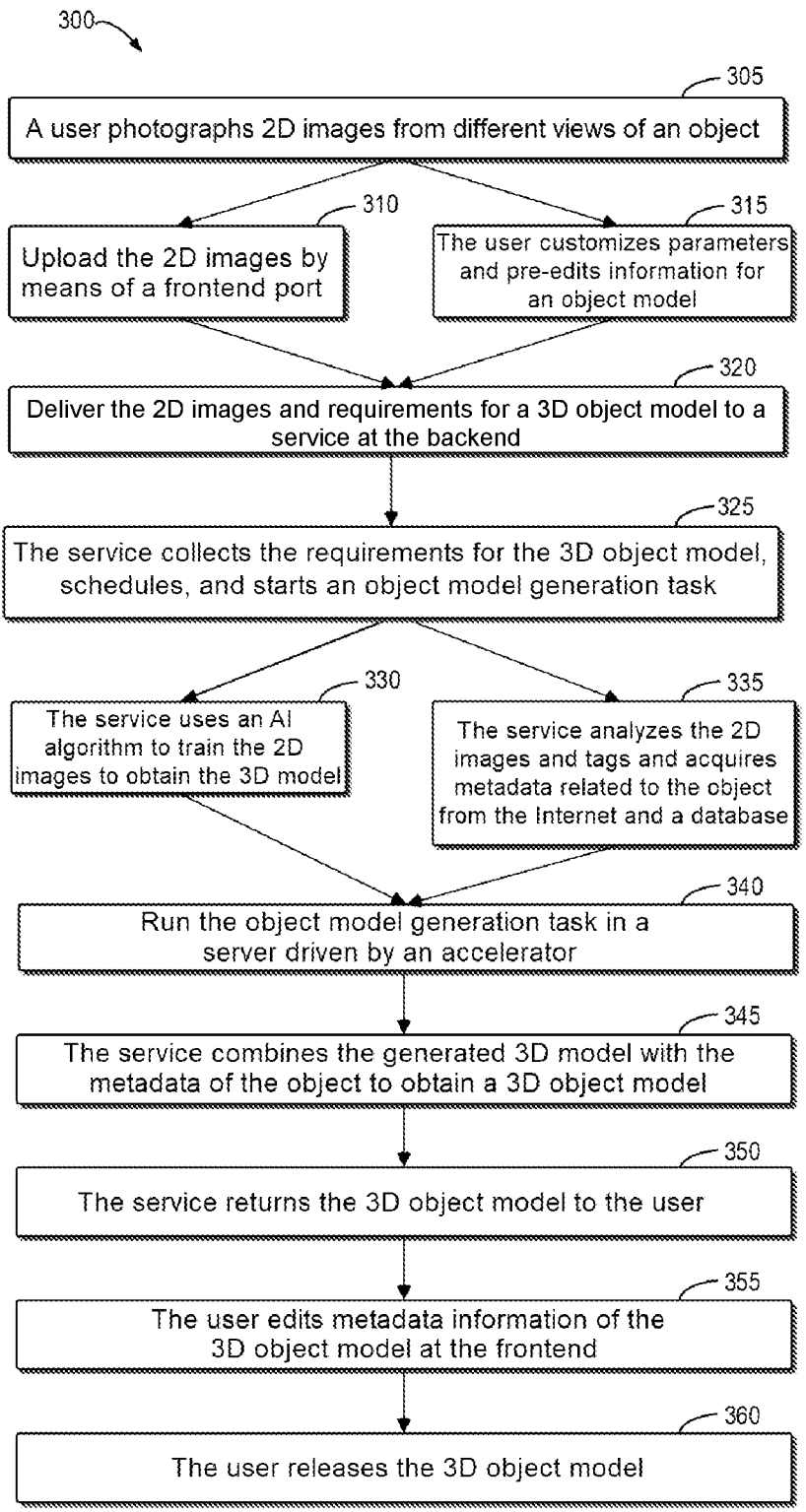
FIG. 3 shows a flow chart illustrating generation of a 3D object model according to embodiments of the present disclosure.

FIG. 3 shows a flow chart of an example process 300 for generating a 3D object model according to embodiments of the present disclosure. FIG. 3 is described with reference to FIGS. 1 and 2 below.

As shown in the example process 300 of FIG. 3, in 305, a user photographs multiple 2D images from different views of an object, and the 2D images may be, for example, the 2D images 110 shown in FIG. 1. In 310, the user uploads these 2D images by means of a frontend port, for example, to a server. The server may provide a service for generating a 3D object model. For example, the service 120 shown in FIG. 1 can be run on the server. In 315, the user may customize (self-define) parameters related to a to-be-generated object model (for example, the 3D object model 170 shown in FIG. 1) and pre-edit information related to the object model. In 320, the frontend delivers these 2D images and requirements related to the to-be-generated object model to a backend. Specifically, the 2D images uploaded in 310 and the parameters customized by the user and information pre-edited by the user and related to the to-be-generated object (for example, the 3D object model 170 shown in FIG. 1) in 315 are delivered from the server frontend to a service (for example, the service 120 shown in FIG. 1) at the backend, for the backend to execute subsequent processing.

At the server backend, in 325, requirements for the object model are collected, scheduling is performed, and an object model generation task is started. In 330, an AI algorithm is used to train the 2D images so as to obtain a visualized 3D model. The visualized 3D model may be, for example, the visualized 3D object model 130 shown in FIG. 1 or a similar one. The AI algorithm used may be, for example, the aforementioned NeRF.

In 335, the 2D images and labels thereof are analyzed so as to acquire metadata related to the object from external information sources such as the Internet and a database. The "Internet" herein may be, for example, the Internet 150 shown in FIG. 1, and the "database" may be, for example, the database 160 shown in FIG. 1. It will be explained later with reference to FIG. 4 regarding how to acquire the metadata related to the object from external information sources such as the Internet and a database.

In 340, an accelerator drives the server to run the object model generation task. This is because if an accelerator is not used, the object model generation task takes too long. Using an accelerator can greatly reduce the time for running the object model generation task to obtain a result.

In 345, the server (specifically, the service running thereon, such as the service 120 shown in FIG. 1) combines the generated 3D object model (for example, the visualized 3D object model 130) with the object metadata obtained in 335 to obtain the to-be-generated 3D object model. The 3D object model may be, for example, the 3D object model 170 shown in FIG. 1. That is, the 3D object model not only is visualized, but also has more metadata and information in addition to visualization. These metadata and information may enable the 3D object model to be conveniently used in virtual scenes such as digital twin, metaverse, AR/VR/MR, and so on. Moreover, these metadata and information are automatically acquired from external information sources and tagged by the service 120, rather than manually acquired from the Internet and databases and manually tagged as in the past. Therefore, it can significantly reduce labor, save costs, and improve efficiency.

In 350, the generated 3D object model is returned from the backend to the frontend. Then, optionally, in 355, the user may post-edit the information (such as the metadata information) of the 3D object model at the frontend. Here, the system according to the present disclosure integrates formats of 3D models generated by software such as 3D MAX and Maya, and therefore, the user can conveniently edit and convert between various formats. As stated above, the integrated or editable object metadata is crucial for improving user experience and accelerating the application of 3D object models in the fields of digital twin and metaverse. Then, in 360, the user releases the 3D object model.

As stated above, an object modeling process not only converts 2D images into a 3D model by means of AI algorithms such as the NeRF, but also detects objects in the images. Object detection algorithms can be any mature artificial intelligence algorithm. After performing object detection, a database is searched for content and the metadata according to the system of the present disclosure, or existing online search methods are used to acquire information about the object from the Internet. Finally, the generated metadata and the generated visualized 3D object model are packaged into a new object model and returned to the user. Therefore, the user can edit the metadata by means of editing tools without using professional 3D design tools.

An example of automatically generating a 3D object model with object metadata from 2D images has been described above. It is clear to those skilled in the art that functions of a system can also be implemented through software. When functions of a system are implemented through software, the software can be provided to users in the form of "service" for scheduling and execution by the users.

Figure 4:
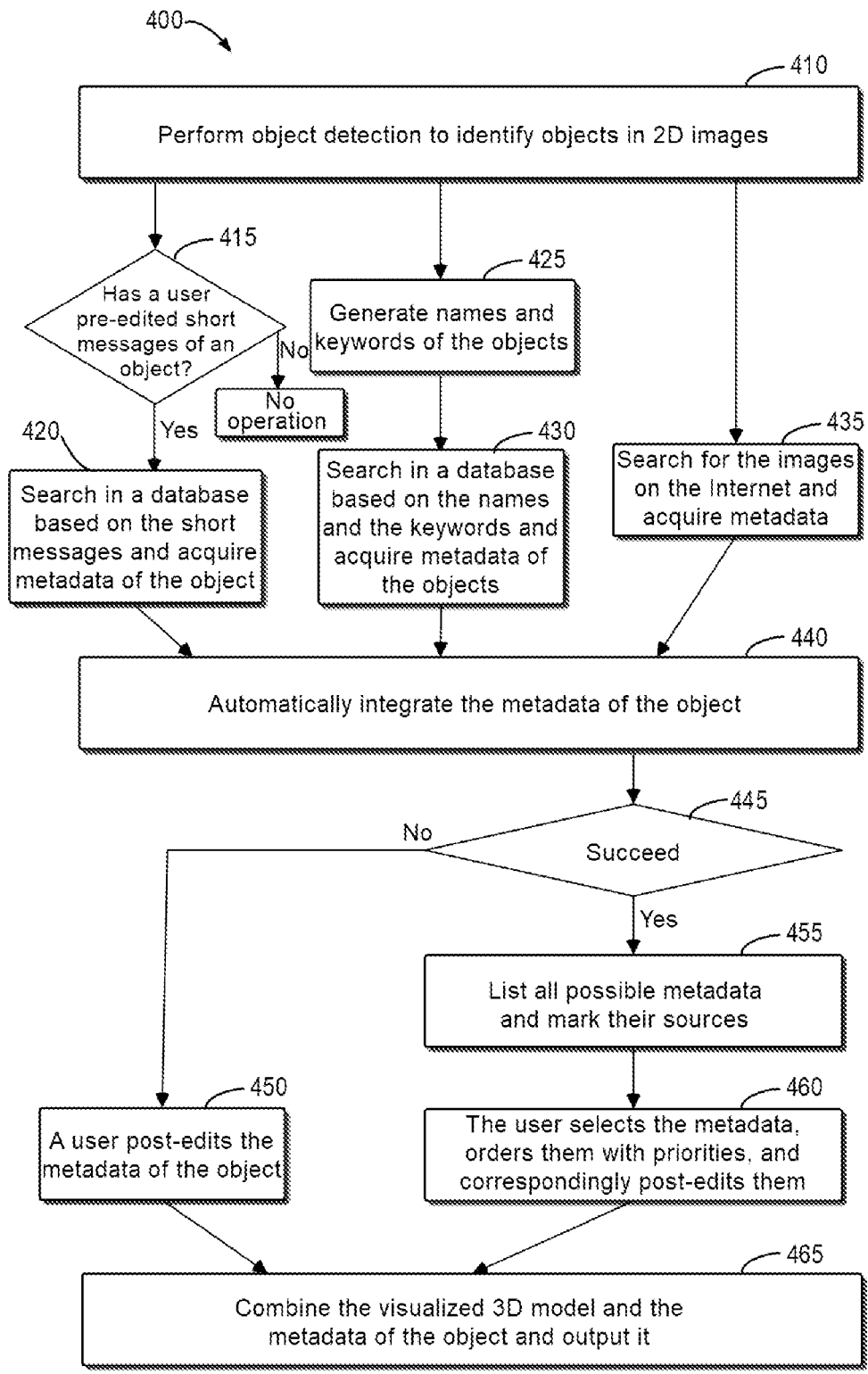
FIG. 4 shows a flow chart illustrating acquisition of 3D object model metadata according to embodiments of the present disclosure.

FIG. 4 shows a flow chart of an example process 400 for generating 3D object model metadata according to embodiments of the present disclosure. FIG. 4 can be regarded as a further refinement and elaboration of the processing performed by a server backend and related to automatic generation of object metadata in FIG. 3.

As shown in FIG. 4, in 410, object detection is performed to identify objects in 2D images. The 2D images are, for example, the 2D images 110 shown in FIG. 1. Here, the object detection algorithm can be any mature convolutional neural network (CNN) algorithm.

In 415, it is judged whether a user has edited short messages related to a to-be-generated object model (for example, the 3D object model 170 shown in FIG. 1). Here, the short messages refer to, for example, parameters customized (self-defined) by the user and related to the to-be-generated object model and information pre-edited by the user and related to the object model as shown in 315 of FIG. 3. If the user has edited short messages related to the to-be-generated object model (that is, it is judged as "yes" in 415), in 420, a search in a database (for example, the database 160 shown in FIG. 1) is performed based on the short messages, and the found object metadata is acquired. Hereinafter, this object metadata is referred to as first object metadata to distinguish it from the object metadata obtained in other ways. If the user does not edit short messages related to the to-be-generated object model (that is, it is judged as "no" in 415), no operation or processing is performed.

In 425, names and keywords of the objects identified in 410 are generated. Then, in 430, a search in a database (for example, the database 160 shown in FIG. 1) is performed based on the names and the keywords, and the found object metadata is acquired. Hereinafter, this object metadata is referred to as second object metadata to distinguish it from the object metadata obtained in other ways.

In 435, the 2D images are searched for on the Internet (for example, the Internet 150 shown in FIG. 1) to obtain metadata information. Hereinafter, this metadata information is referred to as third object metadata to distinguish it from the object metadata obtained in other ways. Here, an image search algorithm can be any mature online image search engine, such as https://images.google.com/or self-developed engines.

In 440, the first object metadata acquired in 420, the second object metadata acquired in 430, and the third object metadata acquired in 435 are integrated to obtain intermediate metadata. Here, the integration specifically includes operations such as combination and deduplication. Then, it is judged in 445 whether the integration processing in 440 succeeds. If the integration processing in 440 does not succeed, that is, the integration processing fails (that is, it is judged as "no" in 445), the user post-edits the first object metadata, the second object metadata, and the third object metadata at the frontend in 450 to obtain final object metadata.

If the integration processing in 440 succeeds (that is, it is judged as "yes" in 445), all possible intermediate metadata are listed in 455, and their sources are marked. Then, in 460, the user selects respective metadata from the intermediate metadata, orders the metadata with priorities, and correspondingly performs post-editing to obtain the final object metadata. The processing may, for example, correspond to the processing as shown in 355 of FIG. 3.

In 465, the visualized 3D model of the object (for example, the visualized 3D model obtained by means of training in 330 of FIG. 3 and the visualized 3D object model 130 as shown in FIG. 1) and the final object metadata obtained in 450 or 460 are combined to obtain a desired 3D object model (for example, the 3D object model 170 shown in FIG. 1) with the metadata information, and the 3D object model with the metadata information is output. Here, the output 3D object model may be an object model that is saved in a new extension file format (different from a conventional defined 3D model file format) after performing format conversion on an existing 3D format (such as 0.3dx, .ma, etc.) and appending object metadata, or can be an archive file that includes a 3D format file and plain text (such as JSON files, etc.) that supports key value pairs.

As stated above, customizable object metadata can be automatically generated by using a system (or hardware or software or a combination of hardware and software that implements its corresponding functions) for generating a 3D object model according to embodiments of the present disclosure. To reduce the manual effort of users to add object metadata to the visualized 3D object model, the object metadata can be automatically acquired from the online Internet or databases. In order to more flexibly operate and add the object metadata at any time according to a user's intention, the user can perform pre-editing before invoking the functions of the system used for generating a 3D object model according to the present disclosure, or perform post-editing after invoking the functions of the system used for generating a 3D object model according to the present disclosure. Therefore, multi-stage customizable and editable object metadata information editing can be achieved.

Figure 5:
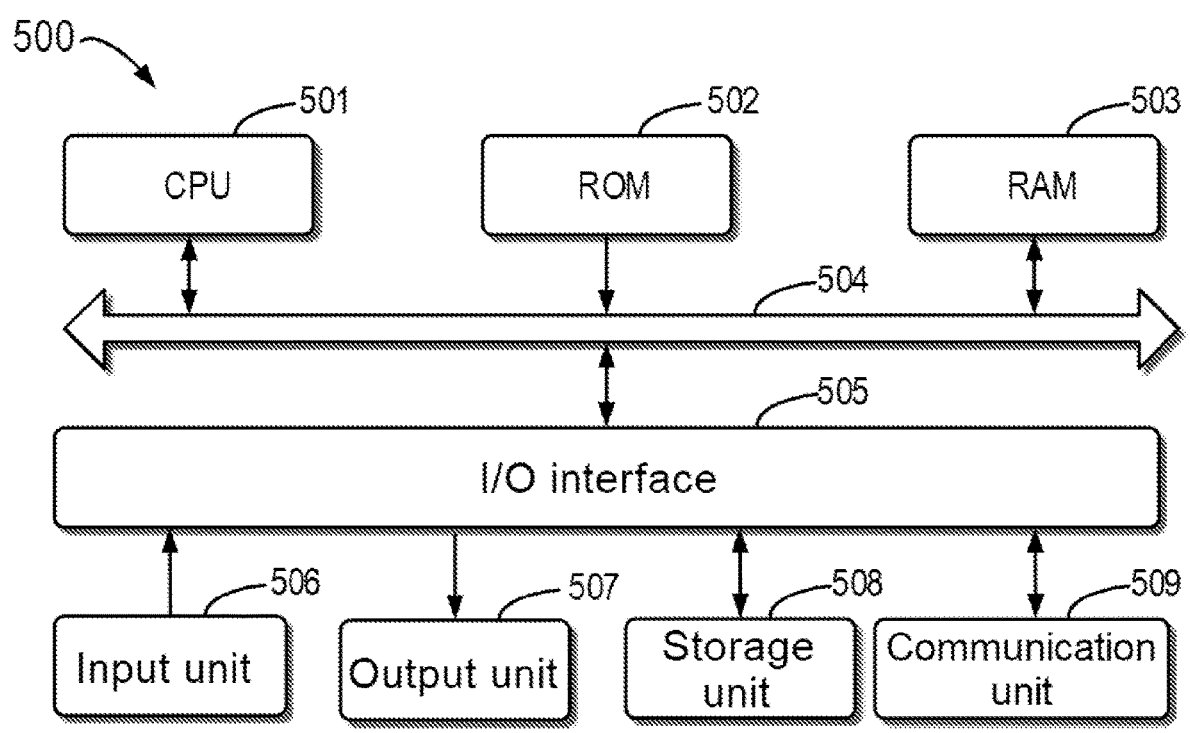
FIG. 5 shows a block diagram of a device that can be used to implement embodiments of the present disclosure.

FIG. 5 is a block diagram of a device 500 that can be used for implementing embodiments of the present disclosure. The device 500 may be a device, an apparatus, or a system described in embodiments of the present disclosure. For example, the device 500 may be any hardware that carries the service 120 of the present disclosure, such as a server, a device (such as a terminal device), and the like. As shown in FIG. 5, the device 500 includes a central processing unit (CPU) 501 which may perform various appropriate actions and processing according to computer program instructions stored in a read-only memory (ROM) 502 or computer program instructions loaded from a storage unit 508 to a random access memory (RAM) 503. Various programs and data required for operations of the device 500 may also be stored in the RAM 503. The CPU 501, the ROM 502, and the RAM 503 are connected to each other through a bus 504. An input/output (I/O) interface 505 is also connected to the bus 504.

A plurality of components in the device 500 are connected to the I/O interface 505, including: an input unit 506, such as a keyboard and a mouse; an output unit 507, such as various types of displays and speakers; a storage unit 508, such as a magnetic disk and an optical disc; and a communication unit 509, such as a network card, a modem, and a wireless communication transceiver. A communication unit 509 allows the device 500 to exchange information/data with other devices via a computer network, such as the Internet, and/or various telecommunication networks.

The various methods and/or processes described above may be executed by the CPU 501. For example, in some embodiments, one or more of the method 200 and the processes 300 and 400 may be implemented as a computer software program that is tangibly included in a machine-readable medium, such as the storage unit 508. For example, in some embodiments, the service 120 (or specifically, a method implemented thereby) may be implemented as a computer software program that is tangibly contained in a machine-readable medium, such as the storage unit 508. In some embodiments, part of or all the computer program may be loaded and/or installed to the device 500 via the ROM 502 and/or the communication unit 509. When the computer program is loaded into the RAM 503 and executed by the CPU 501, one or more steps or actions of the methods and/or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in one or any combination of more programming languages, including object-oriented programming languages and conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flow charts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flow charts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of the device, the method, and the computer program product according to a plurality of embodiments of the present disclosure. In this regard, each block in the flow charts or block diagrams may represent a module, program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:
1. A method, comprising:
generating a first three-dimensional (3D) object model based on multiple two-dimensional (2D) images of an object in different views;
acquiring metadata related to the first 3D object model by searching for information related to the object in at least one of a database and the Internet; and
generating a second 3D object model by combining the first 3D object model and the metadata;
wherein the metadata comprises a plurality of metadata components of respective different types, including (i) first metadata comprising at least one of a description and a tag of at least one additional image identified as being similar to one or more of the 2D images, (ii) second metadata obtained utilizing at least one of a name and a keyword of an object detected in at least one of the 2D images, and (iii) third metadata obtained utilizing user tag information associated with the detected object; and
wherein at least portions of the first, second and third metadata are combined as intermediate metadata.
2. The method according to claim 1, further comprising:
collecting requirements for the metadata,
wherein acquiring the metadata comprises: acquiring the metadata from at least one of the database and the Internet based on the requirements for the metadata.
3. The method according to claim 1, wherein generating the first 3D object model based on the multiple 2D images comprises:
identifying objects in the 2D images by means of object detection; and
determining object information based on the identified objects.
4. The method according to claim 3, wherein acquiring the metadata comprises:
obtaining similar images of the 2D images by searching the Internet based on at least one of the 2D images or tags thereof; and
acquiring at least one of descriptions or tags of the similar images as the first metadata.
5. The method according to claim 4, wherein acquiring the metadata further comprises:

generating names and keywords of the objects based on the object information; and acquiring the second metadata by searching in the database based on at least one of the names and the keywords.

6. The method according to claim 5, wherein acquiring the metadata further comprises:
determining whether there is user tag information that is obtained by pre-editing and is associated with the object; and
acquiring, in a case where the user tag information exists, the third metadata by searching in the database based on the user tag information.

7. The method according to claim 6, wherein the user tag information comprises at least one of the following: time and places where the 2D images were photographed and people, photographers, or copyright information involved in the 2D images.

8. The method according to claim 6, wherein acquiring the metadata further comprises:
combining at least two of the first metadata, the second metadata, and the third metadata to obtain the intermediate metadata.

9. The method according to claim 8, further comprising: marking a source of the intermediate metadata.

10. The method according to claim 9, wherein combining the first 3D object model and the metadata comprises:
post-editing the intermediate metadata to obtain final metadata; and
combining the final metadata and the first 3D object model.

11. The method according to claim 10, wherein at least one of the following items is added to the final metadata during post-editing: resolution, format, training environment, or scene of the first 3D object model.

12. The method according to claim 1, wherein combining the first 3D object model and the metadata comprises:
post-editing at least one of the first metadata, the second metadata, or the third metadata to obtain final metadata; and
combining the final metadata and the first 3D object model.

13. The method according to claim 1, wherein
a file format of the second 3D object model belongs to a defined 3D model file format; or
the file format of the second 3D object model is different from the defined 3D model file format.

14. An electronic device, comprising:
a processing unit; and
a memory coupled to the processing unit and storing instructions, wherein the instructions, when executed by the processing unit, cause the electronic device to perform the following actions:
generating a first three-dimensional (3D) object model based on multiple two-dimensional (2D) images of an object in different views;
acquiring metadata related to the first 3D object model by searching for information related to the object in at least one of a database and the Internet; and
generating a second 3D object model by combining the first 3D object model and the metadata;
wherein the metadata comprises a plurality of metadata components of respective different types, including (i) first metadata comprising at least one of a description and a tag of at least one additional image identified as being similar to one or more of the 2D images, (ii) second metadata obtained utilizing at least one of a name and a keyword of an object detected in at least one of the 2D images, and (iii) third metadata obtained utilizing user tag information associated with the detected object; and
wherein at least portions of the first, second and third metadata are combined as intermediate metadata.

15. The electronic device according to claim 14, further comprising:
collecting requirements for the metadata,
wherein acquiring the metadata comprises:
acquiring the metadata from at least one of the database and the Internet based on the requirements for the metadata.

16. The electronic device according to claim 14, wherein generating the first 3D object model based on the multiple 2D images comprises:
identifying objects in the 2D images by means of object detection; and
determining object information based on the identified objects.

17. The electronic device according to claim 16, wherein acquiring the metadata comprises:
obtaining similar images of the 2D images by searching the Internet based on at least one of the 2D images or tags thereof; and
acquiring at least one of descriptions or tags of the similar images as the first metadata.

18. The electronic device according to claim 17, wherein acquiring the metadata further comprises:
generating names and keywords of the objects based on the object information; and
acquiring the second metadata by searching in the database based on at least one of the names and the keywords.

19. The electronic device according to claim 18, wherein acquiring the metadata further comprises:
determining whether there is user tag information that is obtained by pre-editing and is associated with the object; and
acquiring, in a case where the user tag information exists, the third metadata by searching in the database based on the user tag information.

20. A computer program product, the computer program product being tangibly stored on a non-transitory computer-readable medium and comprising computer-executable instructions, the computer-executable instructions, when executed by a computer, causing the computer to perform the following operations:
generating a visualized first three-dimensional (3D) object model based on multiple two-dimensional (2D) images of an object in different views;
acquiring metadata related to the first 3D object model by searching for information related to the object in at least one of a database and the Internet; and
generating a second 3D object model by combining the first 3D object model and the metadata;
wherein the metadata comprises a plurality of metadata components of respective different types, including (i) first metadata comprising at least one of a description and a tag of at least one additional image identified as being similar to one or more of the 2D images, (ii) second metadata obtained utilizing at least one of a name and a keyword of an object detected in at least one of the 2D images, and (iii) third metadata obtained utilizing user tag information associated with the detected object; and wherein at least portions of the first, second and third metadata are combined as intermediate metadata.

* * * * *